US010115374B2

United States Patent
Nicholl et al.

(10) Patent No.: US 10,115,374 B2
(45) Date of Patent: Oct. 30, 2018

(54) VARIABLE GLYPH ENCODING

(71) Applicant: BlackBerry Limited, Waterloo (CA)

(72) Inventors: Jeremy Alexander Nicholl, Waterloo (CA); Ronald Friedrich Pfeifle, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 153 days.

(21) Appl. No.: 15/157,842

(22) Filed: May 18, 2016

(65) Prior Publication Data
US 2017/0337902 A1    Nov. 23, 2017

(51) Int. Cl.
G06T 11/00    (2006.01)
G09G 5/24    (2006.01)
G06T 11/20    (2006.01)

(52) U.S. Cl.
CPC ............... *G09G 5/24* (2013.01); *G06T 11/20* (2013.01); *G06T 11/203* (2013.01)

(58) Field of Classification Search
CPC ............ G09G 5/24–5/28; G06T 11/20–11/203
See application file for complete search history.

(56) References Cited

U.S. PATENT DOCUMENTS

2004/0006749 A1*    1/2004    Fux .................. G06F 17/214
                                                    715/263
2008/0068383 A1*    3/2008    Dowling ........... G06T 11/206
                                                    345/441

OTHER PUBLICATIONS

Wischusen, J., "Scalable Vector Graphics in HTML5", Jan. 31, 2012, https://www.ibm.com/developerworks/, pp. 1-16.

* cited by examiner

*Primary Examiner* — Charles Tseng
(74) *Attorney, Agent, or Firm* — Jeffrey N. Giunta; Fleit Gibbons Gutman Bongini & Bianco P.L.

(57) ABSTRACT

A system and method for graphically encoding text. A textual data set comprising a plurality of encoded text characters that corresponding to at least one text character to be visually rendered is received. Based on the textual data set, a drawing instruction set is determined that has a respective drawing instruction to draw at least part of a glyph of each of the encoded text characters. Each at least one drawing instruction excludes an indication of a correspondence with an associated text character code, and each respective at least one drawing instruction for a specified text character excludes instructions to repeat other drawing instructions for other instances of the specified text character.

20 Claims, 7 Drawing Sheets

VARIABLE GLYPH ENCODING

FIELD OF THE DISCLOSURE

The present disclosure generally relates to restricting unauthorized interpretation of data, and more particularly to protecting data access based on variable encoding for rendering of text glyphs.

BACKGROUND

Data processing equipment and devices are able to store and communicate data. It is sometimes desirable to protect some or all of a stored or communicated data set from unauthorized interpretation, such as extracting text from a document's data file. Textual documents are often stored in data files with each character defined by a code, such as are defined by ASCII or Unicode standards. Extracting such a document's text is able to be performed by merely copying those standard characters. Uniform encoding of data within instructions to render text glyphs further allows relatively straightforward processing to extract underlying character codes.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Figure 1:
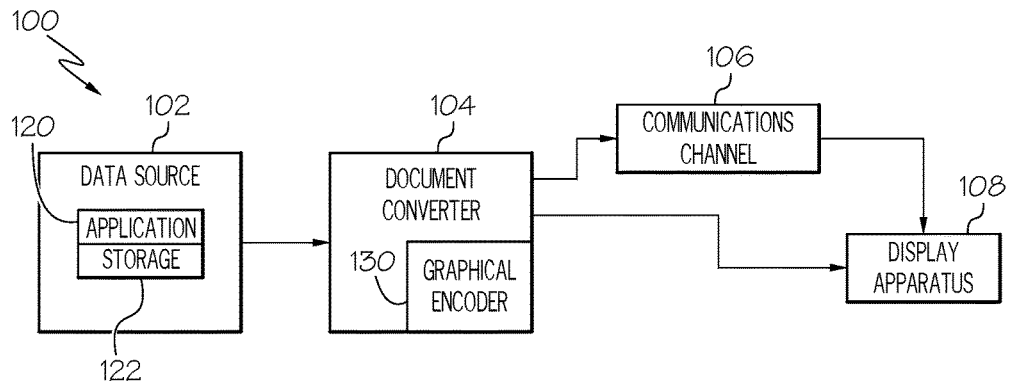
FIG. 1 illustrates a document conversion system, according to an example.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

The below described systems and methods operate to restrict the extraction of textual information from a data file defining a text document. The below described examples store textual document as explicit drawing instructions for each character in the text document. In some of these examples, each character code such as an ASCII or Unicode code point value in a document is replaced with explicit drawing instructions for that character. For example, if an "o" is to be drawn as the filled-in region between two nested circles, each appearance of the letter "o" in a document is replaced with instructions to draw a filled-in region between two nested circles. In general, all of the binary values representing text characters in a document are replaced with requests to draw geometric figures. This prevents the straightforward extraction of encoded text from the document, but the document itself will still present the same text when rendered. In an example, the geometry defining the shapes for the rendered characters is taken from the same font information that would be used to render the encoded text.

Replacing character codes, such as ASCII or Unicode code points, with graphical drawing instructions prevents direct extraction or copying of those character codes, but processing of the data defining these drawing instructions may still be able to extract the represented text. In order to further restrict extracting the textual data from these data files only containing drawing instructions for the text characters, some examples incorporate additional techniques to further obscure the underlying textual characters that those instructions render. In some examples, the drawing instructions are created so that the paths describing the shapes of various multiple characters are combined into composite paths randomly, so that the drawing order of the characters is uncorrelated with the original encoded text. Further, in some examples, closed figures representing specific characters are decomposed into multiple chunks that can be randomly combined into composite curve paths so that the instructions that draw any single character are distributed among multiple distinct drawing requests. Additionally, in some examples, other geometric transformations are performed to further obscure the connection between the original encoded text and the drawing instructions.

In some examples, the drawing instructions in the data file have further characteristics to inhibit extracting the text they represent. In an example, drawing instructions in the data file used to render a text document conform to the "Scalable Vector Graphics" or SVG standard. The SVG standard supports various elements to draw graphical elements that are able to be used to render one or more textual characters. In the following example, elements defined by the SVG standard, such as the <path> element, are examples of drawing instructions. In order to consistently refer to similar concepts, the following description refers to SVG elements, such as the <path> element, at drawing instructions. Further, <path> elements in an SVG compliant data set are referred to herein <path> instructions. The SVG "path" instruction is an example of a drawing instruction that specifies graphical paths to draw such as lines, curves, and the like.

Conventional SVG data sets or files containing SVG elements sometimes define a drawing instruction for a glyph of a particular character and associate a "symbol" tag with that instruction. Each time that particular character is to be rendered in a document, the SVG file merely references that tag value with a <use> node and the drawing instruction is repeated at a specified location. Such references facilitate analysis of the SVG file to allow recovery of the text data since once processing determines the character rendered by that one drawing instruction, further analysis of the SVG file only has to replace each tag with the identified character. In order to inhibit such straightforward analysis and extraction of data, some examples described below do not draw a character by referencing a previously specified drawing instruction for that character. In the some examples, the data file containing drawing instructions for text characters in a document includes a separate and complete drawing instruction for every instance of each character to be displayed.

In some examples, drawing instructions for text characters also exclude annotations that might indicate or infer what text character is being rendered by a drawing instruction. In an example, an SVG <path> element may include a <text> element that specifies characters or binary codes indicating the characters that the <path> element renders.

Further steps are taken in some examples when creating data files that include drawing instructions to render characters in a text document. In some examples, these further steps are directed to impair an ability of a process that operates to identify a particular character that is drawn by a particular drawing instruction in the data file and then searches the data file for copies of that particular drawing instruction. Once the particular character drawn by such an instruction is determined, a process is simply able to find all instances of copies of that drawing instruction in the data file and recreate the text being drawn. Some examples of the following described systems and methods create more complex drawing instructions for the glyphs to be rendered in order to preclude such text data reconstructions.

In an example, the drawing instructions for multiple glyphs are combined into a single drawing instruction. In an example, paths specified to be rendered by an SVG <path> instruction are able to define multiple boundary curves, not just one. Combining the paths for multiple glyphs into one <path> instruction increases the complexity of processing to extract textual data from such a data set. In an example, combining the multiple glyphs into one drawing instruction, such as a <path> instruction, is able to go beyond simply copying the line or curve specifications for the multiple glyphs to be combined. In an example, a transformation matrix is applied to one or more of the characters whose glyph is being combined with others, such as transformation specifying the location of each of those characters in the presentation. This transformation matrix in an example is applied to the each point in the line or curve definitions specified in the path instruction rather than applying a transformation to a rendering that is defined by a path instruction. In these examples, the lines or curves of a glyph specified in a path instruction specifying multiple glyphs do not use copies of line and curve endpoints for each instance of the same glyph. Rather, the endpoints for each line or curve element are translated to the coordinates related to the position on the page for that particular line or component. This further helps to reduce the correlation of drawing instructions for different instances of the same character. As a result, the text strings specifying drawing commands for the path for a given glyph will no longer be textually identical for two different instances of that same glyph in the document.

In some examples, the drawing instructions are sent to a display device to be rendered for presentation to a user. Examples of such display devices include browsers of various types. In some examples, these browsers not only render the entire set of drawing instructions but also include mechanisms to allow different analyses to be performed on the drawing instructions received by the browsers. In some examples, browsers have mechanisms intended for use by developers that go beyond the simple task of rendering the drawings specified by received drawing instructions. In an example, some browsers include mechanisms to dynamically display other metrics, such as bounding boxes, for the images to be rendered in order to help developers to analyze drawings. Such analyses include allowing observation or analysis of the structure of the drawing commands being processed.

In an example of combining multiple glyphs into a single drawing instruction, such as into a single <path> instruction, some browsers treat the concatenated path specified by a single instruction as a single object. These browsers show the bounding box of the entire path, not the individual glyphs within the path. Combining the multiple glyphs into a single drawing instruction in this circumstance hinders the ability to determine which characters are present by using these tools.

In some examples, combining multiple glyphs into a single drawing instruction is limited to combining glyphs with similar visual details. For example, if one glyph is drawn red and another is drawn green, one example will not combine the paths of these glyphs into a single drawing instruction. The combining of glyphs in some examples operates to ensure that glyphs with incompatible rendering styles are not combined into a single drawing instruction.

In some examples, additional steps are used to reduce the correlation of glyphs to drawing paths specified for those glyphs. In an example process an existing SVG file is processed to group a number of "<use>" elements of symbols by the style used to render them. These compatible groups of "uses" are then randomly chosen and their drawing paths are combined together. In an example, groups of two or more glyphs are combined, although any suitable number are able to be chosen for each combination. This reduces the correlation between drawing elements that exist within the same path because any glyphs they might represent aren't likely to be contained in groups of glyphs that are close together in the original strings. This also makes bounding boxes of many paths overlap so that they will not have a strong correlation to the glyphs that the paths reproduce.

Another step used in some examples is to modify the drawing paths for the lines or curves representing different instances of a particular character so that there is even less correlation between the specified paths for each instance of a particular glyph. These modifications to the lines or curves of a particular glyph alter the drawing paths of each glyph so that they appear similar or even visually identical to a human viewer on a display, but contain extra path elements or other perturbations to increase the complexity of identifying instances of the same glyph within the document.

In an example, a <path> instruction may specify drawing a line segment from (0,0) to (1,1). The instruction to draw this single line is able to be replaced in some examples by 2 sequential line segments, one from (0,0) to (0.5,0.5) and another from (0.5,0.5) to (1,1). The splitting point of the original line is able to be chosen randomly to be some point between (0,0) and (1,1). Another modification to segments in a <path> instruction is able to modify other curve types such as arcs, Bezier curves, and the like, that are used to define <path> drawing elements by similarly splitting those segments without modifying the visual appearance of the path. These characteristics of the determined drawing commands tend to make it harder to discover the original path of the glyph and determine the character(s) being rendered by the drawing command.

In some examples, a further step in determining drawing commands includes applying perturbations to the specification of drawing segments in one or more instances of the same glyph. For example, a second rendering of a character "T" may specify the bottom endpoint of a vertical line segment so that the vertical line segment is one pixel longer or shorter than an earlier iteration of the character "T." Such a change may not noticeably change the visual look of the rendered output, but will increase the complexity of identifying the characters being rendered in the output.

The following examples describe systems and method that are able to be applied to convert or create a data file for use with any rendering program or system that allows instructions describing how to draw arcs, lines and curves, and closed figures composed of them. These drawing instructions are able to be specified in a format that is supported by an original document containing encoded text codes, or these instructions are able to be specified with a different format supporting such instructions.

In the present description, drawing commands used to render one or more glyphs specify drawing one or more drawing segments that are used to form the desired glyph on a display. In various examples, drawing segments are able to be specified in any suitable form to create the desired markings on the display. For example, various drawing segments are able to be specified as lines, curves, regions defined between specified boundaries where the region ins filled in with a specified pattern or color, as any other type of drawing segment, or by combinations of these. In some examples of the below described systems and methods, drawing instruction sets are able to be determined for a particular glyph that divide each drawing segment, in whatever form the drawing segment is specified is specified, that defines that glyph into a number of drawing segments that are, in turn, able to be specified in any suitable form that may or may not correspond to the form in which the original drawing segment was specified.

FIG. 1 illustrates a document conversion system 100, according to an example. The document conversion system 100 is an example of a system that accepts a textual data set including encoded text characters. Examples of encoded text characters include, for example, text characters encoded as text character codes defined by the ASCII or Unicode standard, text characters encoded as drawing instructions such as in an SVG compliant document, text characters encoded according to any suitable technique, or combinations of these. The document conversion system converts the textual data set into a data set including a drawing instruction set that specifies drawing instructions to render images of the text specified by the text document. Textual data sets are able to have text characters represented in any suitable format, such as character codes, graphical drawing commands, other formats, or combinations of these. Examples of a document conversion system 100 include a document server that is able to be accessed by users to securely view documents that are protected from access by unauthorized users. In an example, such a document server is able to operate with a Web server to prepare data sets of drawing instructions to be sent to remote Web Browsers to render a presentation of the text in a manner that restricts easy extraction of the original text.

The document conversion system 100 includes a data source 102. The data source 102 is able to produce text documents or other types of textual data sets by any suitable technique. The text documents produced by the data source 102 are an example of a textual data set. Textual data sets in an example are data sets that include textual character codes such as ASCII codes, drawing commands, such as SVG elements, other representations, or combinations of these.

In the illustrated example, data source 102 includes examples of an application 120 and a storage 122 as sources of text documents. In general, an application 120 is able to produce text documents or other types of textual data sets by any type of processing. Storage 122 is able to store, retrieve and produce text documents according to any suitable technique. The text documents or textual data sets are able to be in any suitable format, and in some examples are also able to include non-text elements such as graphics, images, other data, or combinations of these.

This illustrated example depicts only a single application 120 and storage 122 for ease and simplicity of illustration and explanation. In further examples, a data source 102 is able to include any number of applications, storage elements, other data sources, or combinations of these. In some examples, a data source is able to include only one or more applications without any storage elements, only one or more storage elements without applications, only other types of sources without applications or storage elements, or combinations of these.

A document converter 104 receives text documents or other textual data sets from the data source 102 and operates to convert those encoded text documents into drawing instruction sets that include drawing instructions to render glyphs for the characters specified in the received text document. The document converter 104 in an example includes a graphical encoder 130 that determines image drawing instructions that each draws at least part of each glyph for each character in the received textual data set.

The document converter 104 in an example sends determined drawing instruction sets to a display apparatus 108. In various examples, the document converter 104 communicates with the display apparatus 108 via any type of communications channel 106. In further examples, the document converter 104 is able to communicate directly with the display apparatus 108. In an example, the document converter 104 is part of a web server or other document server and the communications channel 106 is the Internet. In such an example, the display apparatus 108 is able to be any suitable browser that communicates with a server over the Internet and is able to render the drawing instruction set determined by the document converter 104.

Figure 2:
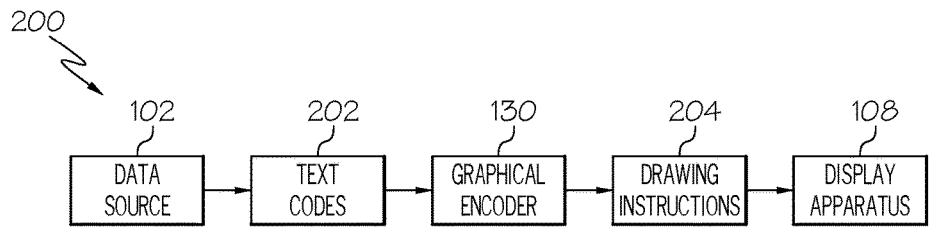
FIG. 2 illustrates a document conversion data flow, according to an example.

FIG. 2 illustrates document conversion data flow 200, according to an example. With reference to the document conversion system 100 described above, the document conversion data flow 200 illustrates a data flow between the above described elements of the document conversion system 100.

The data source 102 produces text codes 202 that are delivered to the graphical encoder 130. These text codes are able to represent text characters by any suitable technique, such as by ASCII or Unicode values, other encoding techniques, or combinations of these. In some examples the text codes are able to be contained in an SVG compliant document that specifies drawing commands for glyphs to be rendered.

The graphical encoder 130 produces drawing instructions 204 that are delivered to the display apparatus 108. As discussed above and described below, the graphical encoder 130 is able to determine these drawing instructions such that they have characteristics that hinder the ability to process the extract the underlying character codes for the glyphs being rendered by these drawing instructions. The display apparatus 108 renders the images specified by these drawing instructions and presents the image in an example to a user.

Figure 3:
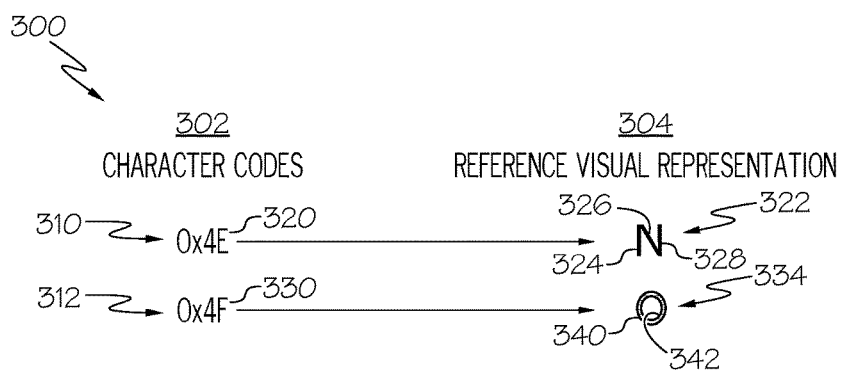
FIG. 3 illustrates character code to drawing instruction conversions, according to an example.

FIG. 3 illustrates character code to drawing instruction conversions 300, according to an example. The illustrated character code to drawing instruction conversions 300 depicts drawing segments that are rendered to present glyphs for two characters, a first character 310, which is for the character "N," and a second character 312, which is for the character "O." The following examples are presented as one description of defining drawing instructions for glyphs of certain characters. In general, that there is no unique graphical way of drawing glyphs for a particular character, such as for the "N" and "O" described below. For example, in some examples the character "N" is able to be drawn with a path that encloses an area, such as is described below for the character "O." A glyph for the character "O" could alternatively be drawn as a single closed circle with a width property for the circular line. In general, there are a large number of ways that a glyph, such as for the below described "N" or "O," can be specified to be drawn and any suitable drawing instruction or instructions are able to be used to specify drawing a suitable glyph for a particular character.

The first character 310 is represented by the first character code 320, which has hexadecimal value 0x4E. 0x4E is the character code for the character "N" in the ASCII standard. A textual data set will represent each instance of the character "N" by this value.

The character "N" in this example is rendered by drawing a first glyph 322 that includes three lines that are each connected to another of those lines. The first glyph 322 includes a first line 324 a second line 326 and a third line 328 to form the three parts of the letter "N." In various examples, these three lines are able to be specified in a single <path> instruction, or spread over two or more <path> instructions.

The second character 312 is similarly represented by the second character code 330, which has hexadecimal value 0X4F. 0X4F is the character code for the character "O" in the ASCII standard and is used to encode each character "O" in text document. The character "O" in this example is rendered by drawing a second glyph 334 that consists of two concentric circles, a first circle 340 and a second circle 342, and filling in the area between those two circles. In various examples, the drawing instructions to draw these two circles and the fill between them are able to be included in one <path> instruction, or these drawing instructions are able to be spread over two or more <path> instructions.

The drawing instructions for each segment of a glyph are able to specify the entire drawing segment, such as the whole line or circle, or the drawing segment is able to be divided into multiple segments or specified by points that are perturbed from other instances of the same character.

Figure 4:
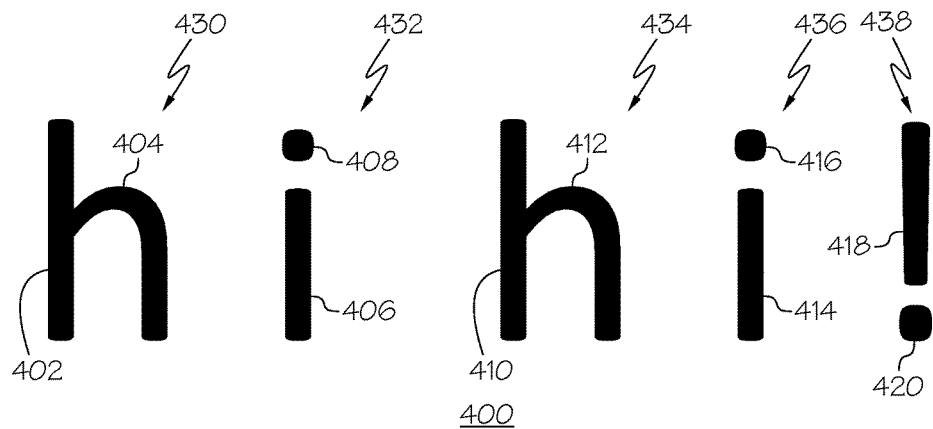
FIG. 4 illustrates a rendered text string, according to an example.

FIG. 4 illustrates a rendered text string 400, according to an example. The rendered text string 400 illustrates an example text string "hi hi!" The rendered text string 400 has two instances of the character "h," two instances of the character "i," and one instance of an exclamation point "!" A space between the first "i" and the second "h" is realized by specifying the location of the second "h" relative to the first "i." The rendered text string 400 is a rendering of text encoded by, for example, ASCII codes for these text characters that may also specify locations for these characters on a display. As described below, the document converter 104 converts these ASCII codes into drawing instructions to render these characters on a display.

The rendered text string 400 includes a first glyph 430, which is a first occurrence of the letter "h" in this example, and a third glyph 434, which is a second occurrence of the letter "h" in this example. The first glyph 430 includes a first vertical line 402 and a first arc 404 and the third glyph 434 similarly includes a third vertical line 410 and a second arch 412. As described below, the drawing instructions for these segments of the respective glyphs for the same character are modified to restrict an ability of processing the drawing instructions to extract the character codes for these two instances of the letter "h."

The rendered text string 400 also includes a second glyph 432, which is a first occurrence of the letter "i" in this example, and a fourth glyph 436, which is a second occurrence of the letter "i" in this example. The second glyph 432 includes a second vertical line 406 and a first dot 408. The fourth glyph 436 similarly includes a fourth vertical line 414 and a second dot 416. As with the above described occurrences of the character "h," the drawing instructions for these segments of the respective glyphs for the same character are modified to restrict an ability of processing the drawing instructions to extract the character codes for these two instances of the letter "i."

The rendered text 400 includes a fifth glyph 438 for the exclamation point "!" The fifth glyph 438 has a fifth vertical line 418 and a third dot 420. The instructions for these segments are similarly modified to restrict an ability for processing to determined that the rendered segments form an exclamation point.

Figure 5:
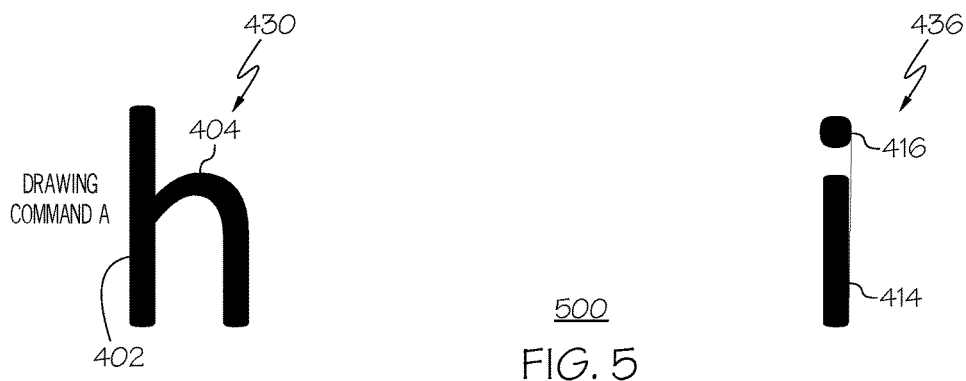
FIG. 5 illustrates a rendering by a drawing instruction A, according to an example.

FIG. 5 illustrates a rendering by a drawing instruction A 500, according to an example. The rendering by a drawing instruction A 500 include a rendering of the entire first glyph 430 and of the entire forth glyph 436. In an example, drawing instruction A is a single <path> instruction that specifies drawing these two complete glyphs. Combining two complete glyphs in a single <path> instruction precludes simple processing to extract the codes for these glyphs based on recognizing the <path> instructions for a particular single glyph. Drawing instruction A in this example includes a <path> instruction that specifies drawing segments to create the first vertical line 402, the first arch 404, the fourth vertical line 414, and the second dot 416.

In various examples, the order of drawing these instructions is able to be altered such that the segments for each individual glyph are not together in the <path> instruction. For example, the <path> instruction is able to specify first drawing the fourth vertical line 414, then drawing the first arc 404, then drawing the second dot 416, and then drawing the first vertical line 402. The specification of drawing these four segments may also use an arbitrary reference point such that the end points or other points specifying these segments have values that are not relative to an endpoint of a segment of a glyph. For example, rather than specifying the first segment, such as the fourth vertical line 414, as starting at the top of that line, the <path> instruction is able to specify starting at an arbitrary point and then moving to the start of the that segment without drawing a line.

Figure 6:
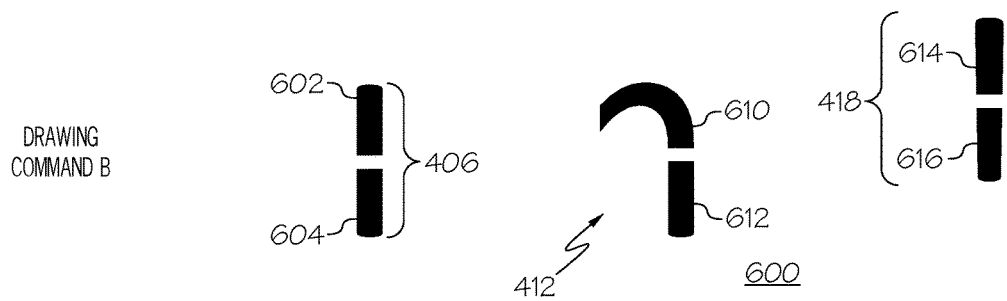
FIG. 6 illustrates a rendering by a drawing instruction B, according to an example.

FIG. 6 illustrates a rendering by a drawing instruction B 600, according to an example. The rendering by a drawing instruction B 600 depicts a more complex separation and combination of drawing segments of multiple glyphs within the rendered text string 400. In the illustrated example, the rendering by a drawing instruction B 600 depicts rendering part of the second glyph 432, part of the third glyph 434, and part of the fifth glyph 438 of the above described rendered text string 400. In particular, the rendering by drawing instruction B 600 depicts a rendering of two segments to form the second vertical line 406 of the second glyph 432, rendering of two segments to form the second arch 412 of the third glyph 434, and rendering of two segments to create the fifth vertical line 418 of the fifth glyph 418. In an example, drawing instruction B is a single <path> instruction that specifies drawing each segment shown in the rendering by a drawing instruction B 600. Separation between partial segments forming one segment in the rendered text string 400 are shown in this description for illustration only and are generally not present in the rendering created by drawing instruction B 600.

The second vertical line 406 is shown to be broken into a first partial vertical line 602 and a second partial vertical line 604. These two partial line segments are drawn adjacent to each other so that no space between the end of the first partial vertical line 602 and the second partial vertical line 604 is presented the rendering presented to the user. The break in this illustration is for description only and in some examples is not included in the rendering presented to the user. The location of this break is able to be in any suitable location within the second vertical line 406. In some examples, the first partial vertical line 602 and the second partial vertical line 604 are able overlap one another, have a separation between their rendering such as is illustrated, are able to be offset from one another, have other variations from the second vertical line 406, or have combinations of these. The division of the fifth vertical line 418 into a third partial vertical line 614 and a fourth partial vertical line 616 is able to have similar characteristics regarding variations, perturbations, or both, relative to the fifth vertical line 418.

The second arc 412 is show to be similarly broken into two portions, a first arc portion 610 and a second arch portion 612. These two portions are able have similar or different characteristics relative to the second arc 412, such as variations in specifying end points or curve characteristics, perturbations relative to the second arc 412, other variations, or combinations of these.

In various examples, the partial segments depicted in the rendering by a drawing instruction B 600 are able to be drawn in any order, including an ordering the intermingles partial segments of different glyphs. For example, drawing instruction B may be a single <path> instruction that specifies drawing these segments in any order. In an example, drawing instruction B is able to specify first drawing the second arc portion 612, then drawing the third partial vertical line 614, then drawing the first partial vertical line 602, then drawing the first arc portion 610, then drawing the second partial vertical line 604, then drawing the fourth partial vertical line 616. In a further example, a subsequent occurrence of drawing a similar combination of these glyphs may specify drawing these same partial segments in a different order.

Figure 7:
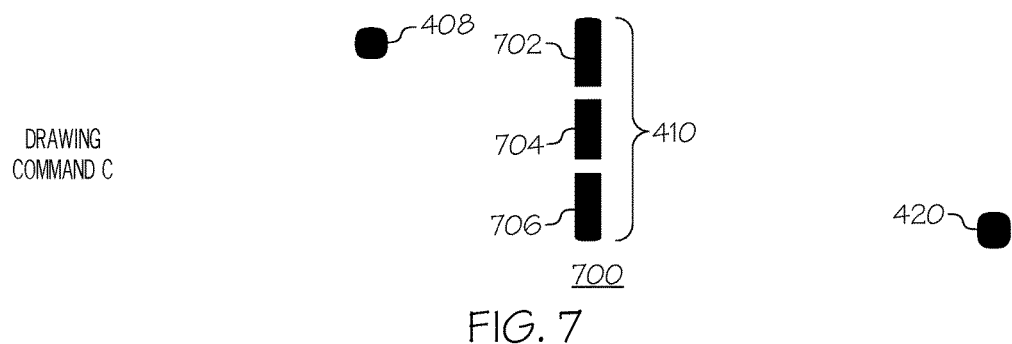
FIG. 7 illustrates a rendering by a drawing instruction C, according to an example.

FIG. 7 illustrates a rendering by a drawing instruction C 700, according to an example. The rendering by drawing instruction C 700 is used in conjunction with the rendering by drawing instruction B 600 to complete the second glyph 432, the third glyph 434, and the fifth glyph 438. In particular, the rendering by drawing instruction C 700 shows rendering of the first dot 408, rendering of the third dot 420, and rendering of the third vertical line 410 by a fifth partial vertical line 702, a sixth partial vertical line 704, and a seventh partial vertical line 706.

In various examples, the third vertical line 410 is able to be separated into the three illustrated partial segments at any point. Further, these partial segments are able to have variations, overlaps, perturbations, other differences, or combinations of these relative to the third vertical line 410. Drawing instruction C is able to be a single <path> instruction that specifies drawing the first dot 408, the third dot 420, the fifth partial vertical line 702, the sixth partial vertical line 704, and the seventh partial vertical line 706 in any order.

In the above example, separately rendering portions of multiple glyphs in different drawing instructions, such as in drawing instruction B and drawing instruction C, further complicates determining which characters are being rendered by processing of these drawing instructions. In general, these separate drawing instructions are able to be separated in a data file by drawing instructions for other glyphs, such as by drawing instruction A described above.

Figure 8:
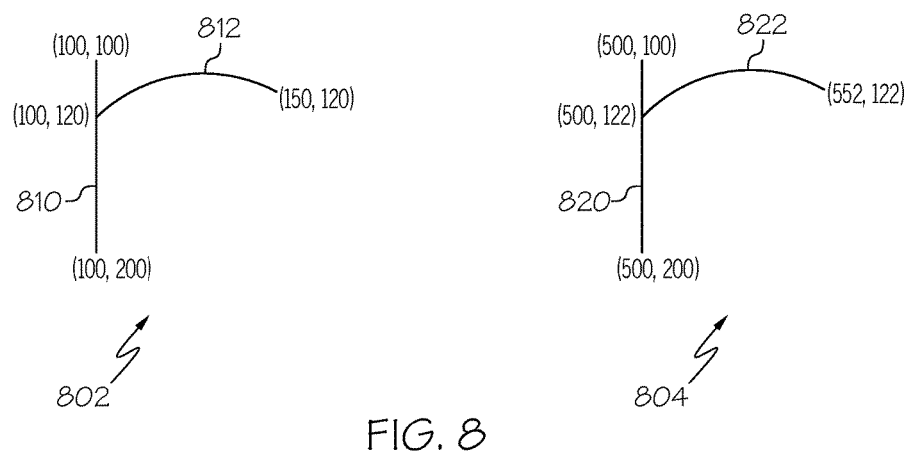
FIG. 8 illustrates a curve drawing modification, according to an example.

FIG. 8 illustrates a curve drawing modification 800, according to an example. The curve drawing modification 800 depicts modifying the drawing of curved segments in a glyph to obfuscate the image being rendered and to complicate extraction of character codes from the drawing instructions without materially altering the rendered image presented to a user. The curve drawing modification 800 includes determining drawing instructions for a glyph that include modification of a specified curved segment along with translations and perturbations of the points used to specify the rendered segments of the glyph.

The curve drawing modification 800 depicts an original glyph 802 for the character "r." The original glyph 802 includes a vertical line 810 and a curve 812. The original glyph 802 in an example is defined by a font definition to be used to render text. The vertical line 810 of the original glyph is shown to be drawn between points (100, 100) and (100, 200). The curve 812 in this example is specified as a quadratic curve between points (100, 120) and (150, 120). In this example, because the curve 812 is drawn as a quadratic curve, it is defined by a second order equation. The drawing instruction determined by the graphical encoder 130 described above modifies these drawing instructions to hinder interpretation of these rendered segments to extract the character code being rendered, i.e., the character "r" in this example.

Drawing instructions for a document presenting an equivalent rendering of the original glyph 802 in this example create a modified glyph rendering 804. The vertical line 810 is rendered as a modified vertical line 820 and the curve 812 is rendered as a modified curve 822. The modified glyph rendering 804 uses translated points to specify the segments of the modified glyph rendering 804. In this example, the modified glyph rendering 804 is translated horizontally by 400 points so that the modified vertical line 820 is specified to be a line drawn between points (500, 100) and (500, 200).

The modified curve 822 is similarly translated 400 points horizontally relative to the original glyph 802. The modified curve 822 in this example is also moved vertically relative to the curve 812 of the original glyph 802. In particular, the modified curve 822 is specified to be a curve drawn between points (500, 122) and (552, 122). This vertical shift of two points relative to the curve 812 of the original glyph preserves the rendered image of the character "r" but hinders processing of drawing instructions to extract the character code of this modified glyph rendering 804. Correlation of instructions for the modified glyph rendering 804 with instructions to render the original glyph 802 is complicated by the horizontal translation of the entire glyph as well as the perturbation of one segment, the modified curve 822, relative to other segments in the modified glyph rendering. The vertical shift in this example is an example of specifying drawing segments at points that are a perturbation from points for segments specified to be drawn by other instructions for the character.

In an example, the modified curve 822 is specified to be drawn as one or more curves that are defined by polynomials with different degrees than the polynomial defining the original curve 812. In an example, the modified curve 822 specified as a curve defined by a polynomial of higher degree where that curve is defined by an equation of higher polynomial order than the curve specifying the original curve 812 specified by the font definition. In an example, the font definition may specify that the curve 812 is to be drawn as a quadratic curve, which is defined by a second order equation. Drawing instructions for the modified curve 822 in an example is able to be specified as a cubic curve or by a curve with an even higher polynomial degree.

Proper specification of a drawing instruction for the modified curve 822 is able to cause a similar or an identical curve or a similar curve to be rendered with curves of higher polynomial degree and thus preserve the appearance of the modified glyph rendering 804 relative to the original glyph 802. In further examples, any type of curve is able to be modified by being rendered by another suitable curve. For example, Bezier curves, quadratic curves, cubic curves, other curves, or combinations of these are able to be used to represent curves specified for a glyph by, for example, a font definition.

In some examples, the modified curve 822 is able to be defined by one or more curves with a lower polynomial degree than the original curve 812. For example, an original curve defined by a third degree equation is able to be approximated by a second degree equation, or the original curve may be divided into multiple segments where at least some of those multiple segments are specified by curves with lower polynomial degree than is specified for the original curve.

Figure 9:
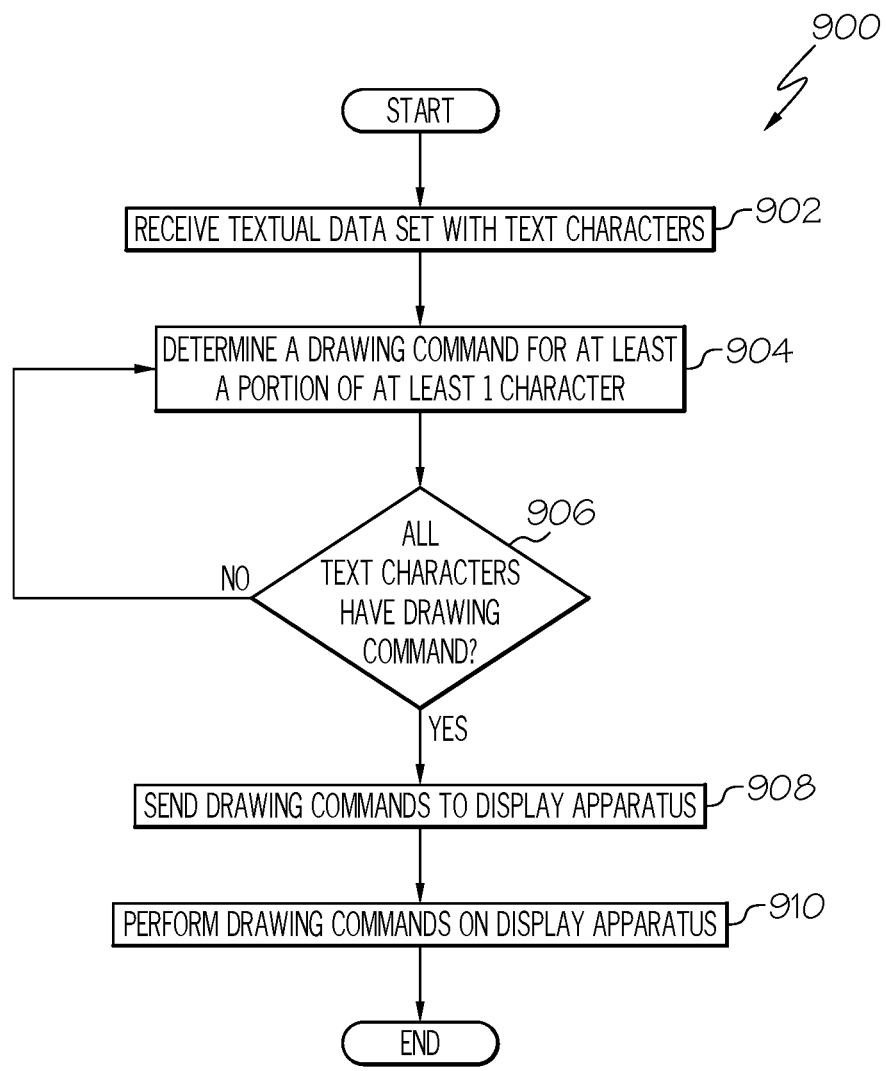
FIG. 9 illustrates a text rendering process, according to an example.

FIG. 9 illustrates a text rendering process 900, according to an example. The text rendering process 900 is an example of a process performed by the document conversion system 100 described above.

The text rendering process 900 begins by receiving, at 802, a textual data set with text characters. This textual data set is able to include character definitions encoded in any format, including character codes, graphical instructions to render characters, any other format, or combinations of these.

A drawing instruction is determined, at 904, for at least one character in the textual data set. As described above, this drawing instruction is able to include instructions to draw all of a glyph for a character, only parts of a glyph for a character, parts of multiple glyphs for multiple characters in the textual data, all of multiple glyphs, other combinations of glyphs, or combinations of these.

A determination is made, at 906, if all characters have drawing instructions. If not all characters have drawing instructions, the text rendering process 900 returns to determining, at 904, a drawing instructions for at least a portion of at least one character.

In one example, a determination that all of the characters in the textual data set have drawing instructions causes the text rendering process 900 continues by sending, at 908, the drawing instructions to a display apparatus, such as the display apparatus 108 described above. The text rendering process 900 then performs the drawing instructions, at 910, on the display apparatus.

In further examples, the drawing commands determined at step 904 are able to be sent to a display apparatus before drawing commands for all of the characters are determined. In an example, a document that is only partially converted into drawing commands is able to be sent to a display apparatus prior to completely converting the entire data set in the document. In such an example, more drawing commands are sent to the display apparatus as they are determined.

Figure 10:
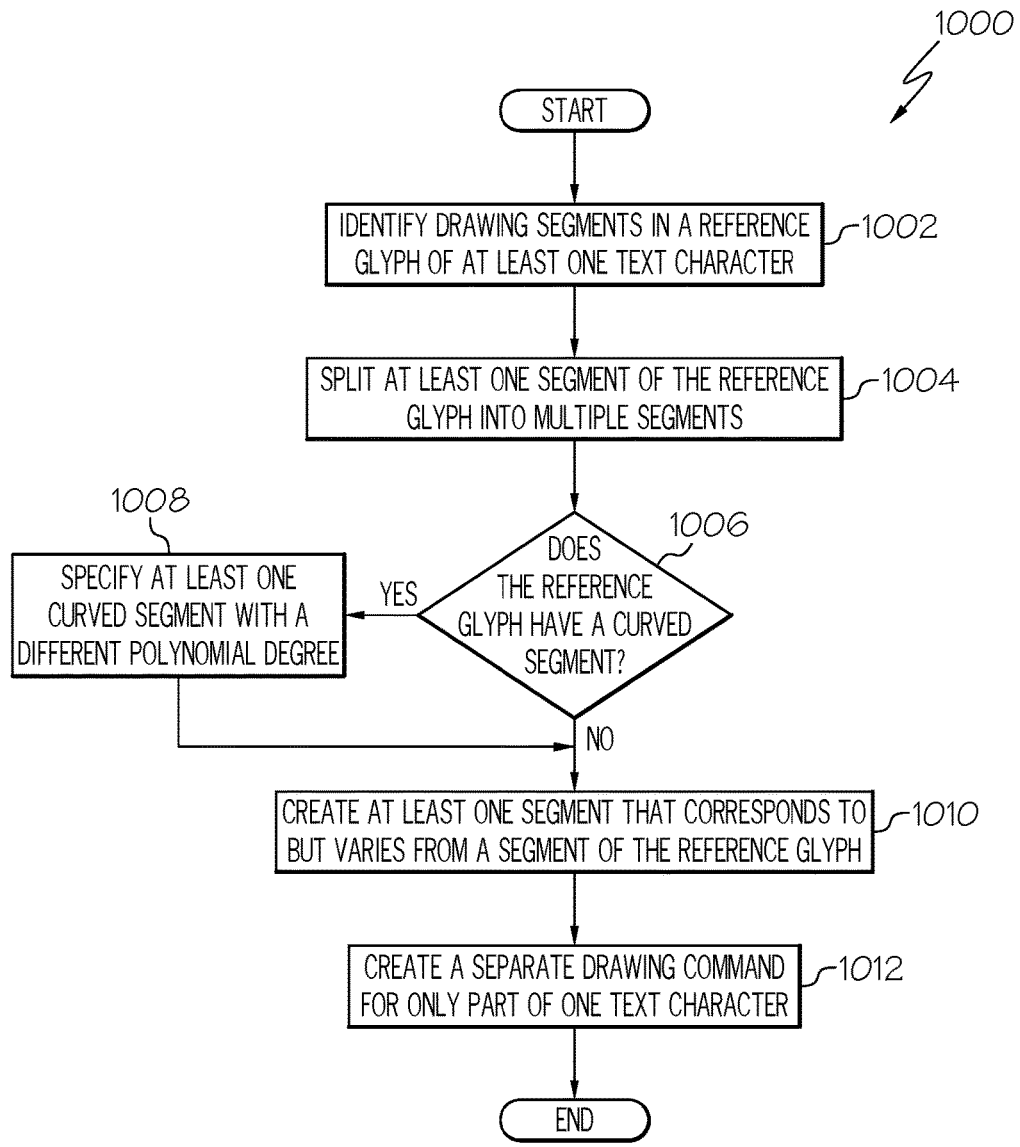
FIG. 10 illustrates an image drawing instruction determination process, according to an example.

FIG. 10 illustrates an image drawing instruction determination process 1000, according to an example. The illustrated image drawing instruction determination process 1000 is an example of a process performed by the document converter 104 described above.

The image drawing instruction determination process 1000 begins by identifying, at 1002, drawing segments in a reference glyph of at least one text character. In an example, a reference glyph is a glyph for a text character that is defined by a font definition. The at least one text character in an example is at least one text character in a received textual data set.

The image drawing instruction determination process 1000 continues by splitting, at 1004, at least one segment of the reference glyph into multiple segments. An example of this splitting is the splitting of the second vertical line 406 into the first partial vertical line 602 and the second partial vertical line 602 as is described above. Each segment of these multiple segments is an example of a partial portion of a path defining a drawing segment of the reference glyph.

A determination is made, at 1006, if the reference glyph has a curved segment. If the reference glyph has a curved segment, a drawing instruction to render that curved segment is determined, at 1008, that specifies at least one curved segment that has a different polynomial degree than that curve in the reference glyph. In an example, a drawing instruction is able to be determined that specifies a cubic curve to replace a quadratic curve specified by a reference glyph that specifies a quadratic curve. In another example, a particular curved segment in the reference glyph is able to be divided into multiple curves that are able to have any suitable shape. In a further example, a curved segment in a reference glyph is able to be replaced by a set of straight line segments such that these new line segments adequately represent the original curved segment when they are rendered.

If the reference glyph does not have a curved segment, or after specifying at least one segment with a different polynomial degree, the image drawing instruction determination process 1000 creates, at 1010, at least one segment that corresponds to but varies from a segment of the reference glyph. An example of such a segment is a segment that has points perturbed from point locations within the reference glyph.

A separate drawing instruction for only part of one character is then created, at 1012. The image drawing instruction determination process 1000 then ends.

Figure 11:
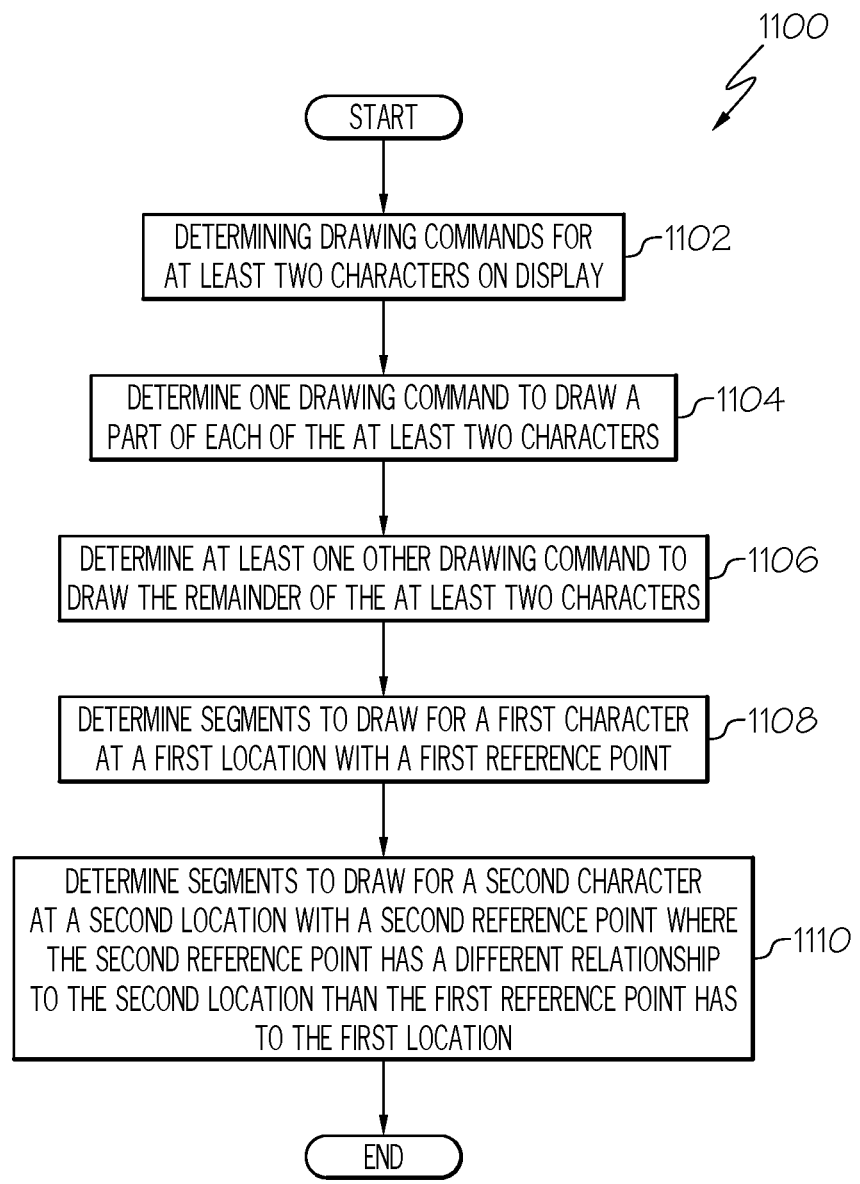
FIG. 11 illustrates a glyph combination process, according to an example.

FIG. 11 illustrates a glyph combination process 1100, according to an example. The glyph combination process 1100 illustrates an example of a process to create a single drawing instruction, such as single <path> instruction, to render at least part of multiple glyphs.

The glyph combination process 1100 begins by determining, at 1102, drawing instructions for at least two characters on a display. An example of such a drawing instructions are drawing instruction A, drawing instruction B, and drawing instruction C that are described above.

A drawing instruction is then determined, at 1104, to draw at least part of each of the at least two characters. An example of such an instruction is drawing instruction B described above. At least one other drawing instruction is determined, at 1106, to draw the remainder of the at least two characters. An example of such an instruction is drawing instruction C described above.

Segments are then determined, at 1108, to draw for a first character at a first location with first reference point. An example of such a segments are segments in the original glyph 802 described above, which may be drawn with a reference point of (100, 100), which is equal to the starting point of drawing that glyph. Segments to draw a second character at a second location with a second reference point are determined, at 1110, where the second reference point has a different relationship to the second location than the first reference point has to the first location. An example of such a determination is determining segments for the modified glyph rendering 804 that uses a reference point of (400, 100). In such an example, the reference point is moved horizontally 100 points relative to the start of the glyph, which is at (500, 100) in that example. The glyph combination process 1100 then ends.

Figure 12:
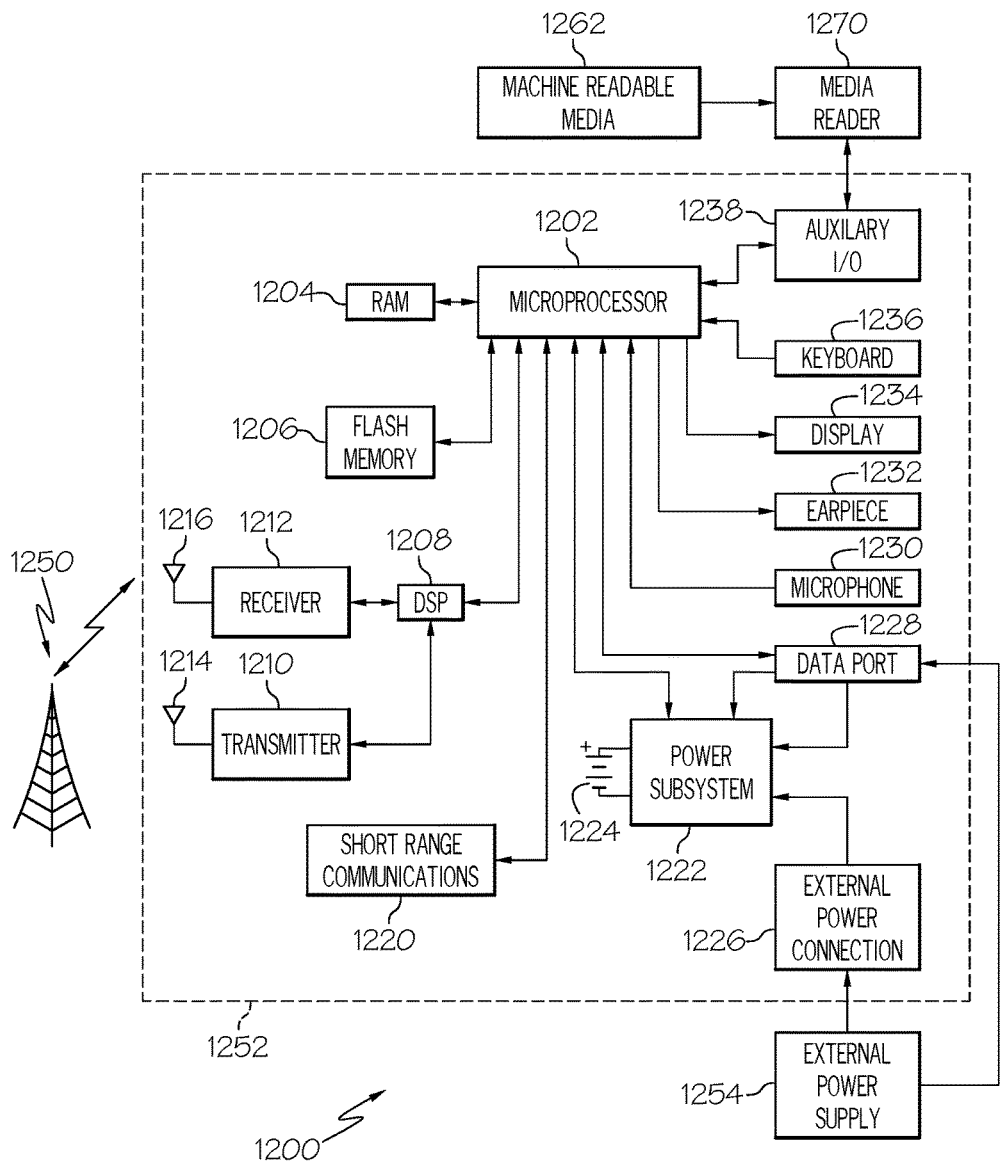
FIG. 12 is a block diagram of an electronic device and associated components in which the systems and methods disclosed herein may be implemented.

FIG. 12 is a block diagram of an electronic device and associated components 1200 in which the systems and methods disclosed herein may be implemented. The electronic device 1252 in this example is a wireless two-way communication device with one or more of the following: voice, text, and data communication capabilities. Such electronic devices communicate with a wireless voice, text, or data network 1250 using a suitable wireless communications protocol. Wireless voice communications may be performed using either an analog or digital wireless communication channel. Data communications allow the electronic device 1252 to communicate with other computer systems via the Internet. Examples of electronic devices that are able to incorporate the above described systems and methods include, for example, a data messaging device, a two-way pager, a cellular telephone with text and data messaging capabilities, a wireless Internet appliance or a data communication device that may or may not include telephony capabilities.

The illustrated electronic device 1252 is an example electronic device that includes two-way wireless communications functions. Such electronic devices may incorporate communication system elements such as a wireless transmitter 1210, a wireless receiver 1212, and associated components such as one or more antenna elements 1214 and 1216. A digital signal processor (DSP) 1208 performs processing to extract data from received wireless signals and to generate signals to be transmitted. The particular design of the communication system may be dependent upon the communication network and associated wireless communications protocols with which the device is intended to operate.

The electronic device 1252 includes a microprocessor 1202 that controls the overall operation of the electronic device 1252. The microprocessor 1202 interacts with the above described communications system elements and also interacts with other device systems. In various examples, the electronic device 1252 is able to include one or more of various components such as a flash memory 1206, random access memory (RAM) 1204, auxiliary input/output (I/O) device 1238, data port 1228, display 1234, keyboard 1236, earpiece 1232, audio sound reproduction system 1270, microphone 1230, a short-range communications system 1220, a power system 1222, other systems, or combinations of these.

One or more power storage or supply elements, such as a battery 1224, are connected to a power system 1222 to provide power to the circuits of the electronic device 1252. The power system 1222 includes power distribution circuitry for providing power to the electronic device 1252 and also contains battery charging circuitry to manage recharging the battery 1224 (or circuitry to replenish power to another power storage element). The power system 1222 receives electrical power from external power supply 1254. The power system 1222 is able to be connected to the external power supply 1254 through a dedicated external power connector (not shown) or through power connections within the data port 1228. The power system 1222 includes a battery monitoring circuit that is operable to provide a status of one or more battery status indicators, such as remaining capacity, temperature, voltage, electrical current consumption, and the like, to various components of the electronic device 1252.

The data port 1228 is able to support data communications between the electronic device 1252 and other devices through various modes of data communications, such as high speed data transfers over an optical communications circuits. Data port 1228 is able to support communications with, for example, an external computer or other device. In some examples, the data port 1228 is able to include electrical power connections to provide externally provided electrical power to the electronic device 1252, deliver electrical power from the electronic device 1252 to other externally connected devices, or both. Data port 1228 of, for example, an electronic accessory is able to provide power to an electronic circuit, such as microprocessor 1202, and support exchanging data between the microprocessor 1202 and a remote electronic device that is connected through the data port 1228.

Data communication through data port 1228 enables a user to set preferences through the external device or through a software application and extends the capabilities of the device by enabling information or software exchange through direct connections between the electronic device 1252 and external data sources rather than via a wireless data communication network. In addition to data communication, the data port 1228 provides power to the power system 1222 to charge the battery 1224 or to supply power to the electronic circuits, such as microprocessor 1202, of the electronic device 1252.

Operating system software used by the microprocessor 1202 is stored in flash memory 1206. Examples of flash memory 1206 are able to include, for example, flash memory, magnetic based storage devices, other volatile or non-volatile data store elements, or the like. Some examples are able to use flash memory 1206 that includes a battery backed-up RAM or other non-volatile storage data elements to store operating systems, other executable programs, or both. The operating system software, device application software, or parts thereof, are able to be temporarily loaded into volatile data storage such as RAM 1204. Data received via wireless communication signals or through wired communications are also able to be stored to RAM 1204. The microprocessor 1202 in some examples are able to execute program components, such as is able to be defined in flash memory 1206 in one example, that cause the microprocessor 1202 to perform the above described processes and methods.

The microprocessor 1202, in addition to its operating system functions, is able to execute software applications on the electronic device 1252. A set of applications that control basic device operations, including at least data and voice communication applications, is able to be installed on the electronic device 1252 during manufacture. In an example, programs and other data used to support the processes described above are able to be installed in the memory of the electronic device 1252. Further examples of applications that are able to be loaded onto the device may be a personal information manager (PIM) application having the ability to organize and manage data items relating to the device user, such as, but not limited to, e-mail, calendar events, voice mails, appointments, and task items. The applications are able to include the above described base applications, which may be installed during manufacture or from another trusted and verified source, along with user applications that may be installed at any time.

Further applications may also be loaded onto the electronic device 1252 through, for example, the wireless network 1250, an auxiliary I/O device 1238, Data port 1228, short-range communications system 1220, or any combination of these interfaces. Such applications are then able to be installed by a user in the RAM 1204 or a non-volatile store for execution by the microprocessor 1202.

In a data communication mode, a received signal such as a text message or web page download is processed by the communication system, including wireless receiver 1212 and wireless transmitter 1210, and communicated data is provided the microprocessor 1202, which is able to further process the received data. In some examples, the electronic device 1252 includes a display, output ports, or combinations of these. In such examples, the received data is able to be processed for output to the display 1234, or alternatively, to an auxiliary I/O device 1238 or the Data port 1228. In examples of the electronic device 1252 that include a keyboard 1236 or other similar input facilities, a user of the electronic device 1252 may also compose data items, such as e-mail messages, using the keyboard 1236, which is able to include a complete alphanumeric keyboard or a telephone-type keypad, in conjunction with the display 1234 and possibly an auxiliary I/O device 1238. Such composed items are then able to be transmitted over a communication network through the communication system.

For voice communications, overall operation of the electronic device 1252 is substantially similar, except that received signals are generally provided to an earpiece 1232 and signals for transmission are generally produced by a microphone 1230. Alternative voice or audio I/O systems, such as a voice message recording system, may also be implemented on the electronic device 1252. Although voice or audio signal output is generally accomplished primarily through the earpiece 1232, in examples of electronic devices 1252 that include a display 1234, the display 1234 may also be used to provide an indication of the identity of a calling party, the duration of a voice call, or other voice call related information, for example.

Depending on conditions or statuses of the electronic device 1252, one or more particular functions associated with a system circuit may be disabled, or an entire system circuit may be disabled. For example, if the battery temperature is low, then voice functions may be disabled, but data communications, such as e-mail, may still be enabled over the communication system.

A short-range communications system 1220 provides for data communication between the electronic device 1252 and different systems or devices, which need not necessarily be similar devices. For example, the short-range communications system 1220 includes an infrared device and associated circuits and components or a Radio Frequency based communication module such as one supporting Bluetooth® communications, to provide for communication with similarly-enabled systems and devices, including the data file transfer communications described above. The short-range communications system is also able to include one or more of components to support communications over wireless links such as Wi-Fi®, Near Field Communications (NFC), any other short range link, or combinations of these A media reader 1260 is able to be connected to an auxiliary I/O device 1238 to allow, for example, loading computer readable program code of a computer program product into the electronic device 1252 for storage into flash memory 1206. One example of a media reader 1260 is an optical drive such as a CD/DVD drive, which may be used to store data to and read data from a computer readable medium or storage product such as computer readable storage media 1262. Examples of suitable computer readable storage media include optical storage media such as a CD or DVD, magnetic media, or any other suitable data storage device. Media reader 1260 is alternatively able to be connected to the electronic device through the Data port 1228 or computer readable program code is alternatively able to be provided to the electronic device 1252 through the wireless network 1250.

Information Processing System

The present subject matter can be realized in hardware, software, or a combination of hardware and software. A system can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present subject matter can also be embedded in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include non-transitory computer readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information.

Non-Limiting Examples

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A method, comprising:
receiving a textual data set comprising a plurality of character codes, each respective character code comprising a code value indicating at least one respective text character to be visually rendered; and
determining, based on the textual data set, a drawing instruction set comprising, for each respective code value within the plurality of character codes, a respective at least one drawing instruction in a rendering language to draw at least part of a glyph of the respective code value,
wherein each respective at least one drawing instruction excludes an indication of a correspondence with the respective character code,
wherein each respective at least one drawing instruction for a specified text character excludes instructions to repeat drawing instructions specified for other instances of the specified text character.

2. The method of claim 1,
wherein a reference glyph indicated by a respective character code within the plurality of character codes specifies at least one drawing instruction that defines a plurality of respective drawing segments, where each respective drawing segment is defined by a respective path,
where a respective drawing instruction for at least one respective drawing segment in the plurality of respective drawing segments specifies one respective path, and
wherein the determining the drawing instruction set comprises determining respective drawing instructions to draw a plurality of sub paths, where each sub-path comprises a partial portion of the one respective path.

3. The method of claim 1, wherein a reference glyph for indicated by at least one character code within the plurality of character codes specifies at least one drawing instruction that defines a reference curved segment having a reference polynomial degree, and
wherein a respective drawing instruction in the drawing instruction set corresponding to the reference curved segment comprises drawing instructions for a curved segment having a polynomial degree greater that the reference polynomial degree.

4. The method of claim 1,
wherein the textual data set comprises:
a first character code indicating a first presentation of a specified text character at a first location; and
a second character code indicating a second presentation of the specified text character at a second location different from the first location,
wherein a presentation of the specified text character comprises a particular drawing segment that has a particular length and a particular shape, and
wherein a respective at least one drawing instruction for the first presentation specifies a respective first drawing segment corresponding to the particular drawing segment that has a first length and a first shape, and
a respective at least one drawing instruction for the second presentation specifies a respective second drawing segment corresponding to the particular drawing segment that has a second length and a second shape,
wherein at least one of the second length is a perturbation of the first length or the second shape is a perturbation of the first shape.

5. The method of claim 1,
wherein the textual data set comprises:
a first character code indicating a first presentation of a first text character at a first location; and
a second character code indicating a second presentation of a second text character at a second location different from the first location, and
wherein the drawing instruction set comprises one single drawing instruction in the rendering language that comprises instructions for drawing at least part of the first presentation and the second presentation.

6. The method of claim 1,
wherein the textual data set comprises:
a first character code indicating a first presentation of a first text character at a first location; and
a second character code indicating a second presentation of a second text character at a second location different from the first location, and wherein the drawing instruction set comprises:
a first single drawing instruction in the rendering language that comprises instructions for drawing a first part of the first presentation and a first part of the second presentation; and
a second single drawing instruction in the rendering language, separate from the first single drawing instruction, that comprises instructions for drawing a second part of the first presentation and a second part of the second presentation,
wherein the second part of the first presentation is different than the first part of the first presentation, and
wherein the second part of the second presentation is different than the first part of the second presentation.

7. The method of claim 1, wherein the plurality of character codes comprise codes defined by one of an American Standard Code for Information Interchange (ASCII) standard or a Unicode standard.

8. A system, comprising:
a document converter that, when operating, receives a textual data set comprising a plurality of character codes, each respective character code comprising a code value indicating at least one respective text character to be visually rendered; and a graphical encoder that, when operating, determines, based on the textual data set, a drawing instruction set comprising, for each respective code value within the plurality of character codes, a respective at least one drawing instruction in a rendering language to draw at least part of a glyph of the respective code value,
   wherein each respective at least one drawing instruction excludes an indication of a correspondence with the respective character code,
   wherein each respective at least one drawing instruction for a specified text character excludes instructions to repeat drawing instructions specified for other instances of the specified text character.

9. The system of claim 8,
wherein a reference glyph indicated by a respective character code within the plurality of character codes specifies at least one drawing instruction that defines a plurality of respective drawing segments, where each respective drawing segment is defined by a respective path,
where a respective drawing instruction for at least one respective drawing segment in the plurality of respective drawing segments specifies one respective path, and
wherein the graphical encoder determines the drawing instruction set by at least determining respective drawing instructions to draw a plurality of sub paths, where each sub-path comprises a partial portion of the one respective path.

10. The system of claim 8,
wherein a reference glyph indicated by at least one character code within the plurality of character codes specifies at least one drawing instruction that defines a reference curved segment having a reference polynomial degree, and
wherein a respective drawing instruction in the drawing instruction set corresponding to the reference curved segment comprises drawing instructions for a curved segment having a polynomial degree greater that the reference polynomial degree.

11. The system of claim 8,
wherein the textual data set comprises:
   a first character code indicating a first presentation of a specified text character; and
   a second character code indicating a second presentation of the specified text character, the second presentation having a transformation relative to the first presentation,
   wherein a respective at least one drawing instruction for the second presentation specifies drawing segments at points that differ, based on the transformation, from points for segments specified to be drawn by a respective at least one drawing instruction for the first presentation.

12. The system of claim 8,
wherein the textual data set comprises:
   a first character code indicating a first presentation of a specified text character at a first location; and
   a second character code indicating a second presentation of the specified text character at a second location different from the first location,
   wherein a presentation of the specified text character comprises a particular drawing segment that has a particular length and a particular shape, and
   wherein a respective at least one drawing instruction for the first presentation specifies a respective first drawing segment corresponding to the particular drawing segment that has a first length and a first shape, and
   a respective at least one drawing instruction for the second presentation specifies a respective second drawing segment corresponding to the particular drawing segment that has a second length and a second shape, wherein at least one of the second length is a perturbation of the first length or the second shape is a perturbation of the first shape.

13. The system of claim 8,
wherein the textual data set comprises:
   a first character code indicating a first presentation of a first text character at a first location; and
   a second character code indicating a second presentation of a second text character at a second location different from the first location, and wherein the drawing instruction set comprises:
   a first single drawing instruction in the rendering language that comprises instructions for drawing a first part of the first presentation and a first part of the second presentation; and
   a second single drawing instruction in the rendering language, separate from the first single drawing instruction, that comprises instructions for drawing a second part of the first presentation and a second part of the second presentation,
   wherein the second part of the first presentation is different than the first part of the first presentation, and
   wherein the second part of the second presentation is different than the first part of the second presentation.

14. A non-transitory computer readable storage medium having computer readable program code embodied therewith, the computer readable program code comprising instructions for:
   receiving a textual data set comprising a plurality of character codes, each respective character code comprising a code value indicating at least one respective text character to be visually rendered; and
   determining, based on the textual data set, a drawing instruction set comprising, for each respective code value within the plurality of character codes, a respective at least one drawing instruction in a rendering language to draw at least part of a glyph of the respective code value,
      wherein each respective at least one drawing instruction excludes an indication of a correspondence with the respective character code,
      wherein each respective at least one drawing instruction for a specified text character excludes instructions to repeat drawing instructions specified for other instances of the specified text character.

15. The non-transitory computer readable storage medium of claim 14,
   wherein a reference glyph indicated by a respective character code within the plurality of character codes specifies at least one drawing instruction that defines a plurality of respective drawing segments, where each respective drawing segment is defined by a respective path,
   where a respective drawing instruction for at least one respective drawing segment in the plurality of respective drawing segments specifies one respective path, and
   wherein the determining the drawing instruction set comprises determining respective drawing instructions to draw a plurality of sub paths, where each sub-path comprises a partial portion of the one respective path.

16. The non-transitory computer readable storage medium of claim 14,
   wherein a reference glyph indicated by at least one character code within the plurality of character codes specifies at least one drawing instruction that defines a reference curved segment having a reference polynomial degree, and
   wherein a respective drawing instruction in the drawing instruction set corresponding to the reference curved segment comprises drawing instructions for a curved segment having a polynomial degree greater that the reference polynomial degree.

17. The non-transitory computer readable storage medium of claim 14,
   wherein the textual data set comprises:
      a first character code indicating a first presentation of a specified text character; and
      a second character code indicating a second presentation of the specified text character, the second presentation having a transformation relative to the first presentation,
   wherein a respective at least one drawing instruction for the second presentation specifies drawing segments at points that differ, based on the transformation, from points for segments specified to be drawn by a respective at least one drawing instruction for the first presentation.

18. The non-transitory computer readable storage medium of claim 14,
   wherein the textual data set comprises:
      a first character code indicating a first presentation of a specified text character at a first location; and
      a second character code indicating a second presentation of the specified text character at a second location different from the first location,
      wherein a presentation of the specified text character comprises a particular drawing segment that has a particular length and a particular shape, and
   wherein a respective at least one drawing instruction for the first presentation specifies a respective first drawing segment corresponding to the particular drawing segment that has a first length and a first shape, and
   a respective at least one drawing instruction for the second presentation specifies a respective second drawing segment corresponding to the particular drawing segment that has a second length and a second shape, wherein at least one of the second length is a perturbation of the first length or the second shape is a perturbation of the first shape.

19. The non-transitory computer readable storage medium of claim 14,
   wherein the textual data set comprises:
      a first character code indicating a first presentation of a first text character at a first location; and
      a second character code indicating a second presentation of a second text character at a second location different from the first location, and
      wherein the drawing instruction set comprises one single drawing instruction in the rendering language that comprises instructions for drawing at least part of the first presentation and the second presentation.

20. The non-transitory computer readable storage medium of claim 14,
   wherein the textual data set comprises:
      a first character code indicating a first presentation of a first text character at a first location; and
      a second character code indicating a second presentation of a second text character at a second location different from the first location, and
   wherein the drawing instruction set comprises:
      a first single drawing instruction in the rendering language that comprises instructions for drawing a first part of the first presentation and a first part of the second presentation; and
      a second single drawing instruction in the rendering language, separate from the first single drawing instruction, that comprises instructions for drawing a second part of the first presentation and a second part of the second presentation,
   wherein the second part of the first presentation is different than the first part of the first presentation, and
   wherein the second part of the second presentation is different than the first part of the second presentation.

* * * * *